United States Patent
Smirnov et al.

(10) Patent No.: US 11,010,870 B2
(45) Date of Patent: *May 18, 2021

(54) TWO STAGE MULTI-SCALE PROCESSING OF IMAGE DATA

(71) Applicant: Apple Inc., Cupertino, CA (US)

(72) Inventors: Maxim W. Smirnov, Wilsonville, OR (US); David R. Pope, Fremont, CA (US); Oren Kerem, Sunnyvale, CA (US); Elena Lamburn, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/848,287

(22) Filed: Apr. 14, 2020

(65) Prior Publication Data

US 2020/0242731 A1 Jul. 30, 2020

Related U.S. Application Data

(63) Continuation of application No. 16/100,823, filed on Aug. 10, 2018, now Pat. No. 10,657,623.

(51) Int. Cl.
*G06T 3/40* (2006.01)
*G06T 5/00* (2006.01)
*G06T 7/90* (2017.01)
*G06T 5/20* (2006.01)

(52) U.S. Cl.
CPC ............ *G06T 3/4007* (2013.01); *G06T 5/002* (2013.01); *G06T 5/003* (2013.01); *G06T 5/008* (2013.01); *G06T 5/20* (2013.01); *G06T 7/90* (2017.01)

(58) Field of Classification Search
None
See application file for complete search history.

(56) References Cited

U.S. PATENT DOCUMENTS

| | | | |
|---|---|---|---|
| 7,889,949 B2 | 2/2011 | Cohen et al. |
| 8,594,452 B2 | 11/2013 | Chen |
| 8,670,630 B1 | 3/2014 | Kwatra |
| 8,855,416 B2 | 10/2014 | Jang et al. |
| 8,958,476 B2 | 2/2015 | Kim et al. |
| 9,148,560 B2 | 9/2015 | Aoki et al. |
| 9,305,362 B1 | 4/2016 | Szedo et al. |
| 9,916,637 B1 | 3/2018 | Smirnov |
| 2006/0008181 A1 | 1/2006 | Takekoshi |
| 2007/0165962 A1 | 7/2007 | Smirnov et al. |
| 2008/0267494 A1 | 10/2008 | Cohen et al. |
| 2010/0073522 A1 | 3/2010 | Siddiqui et al. |

(Continued)

*Primary Examiner* — David Perlman
(74) *Attorney, Agent, or Firm* — Fenwick & West LLP (57) ABSTRACT

Embodiments relate to two stage multi-scale processing of an image. A first stage processing circuitry generates an unscaled single color version of the image that undergoes noise reduction before generating a high frequency component of the unscaled single color version. A scaler generates a first downscaled version of the image comprising a plurality of color components. A second stage processing circuitry generates a plurality of sequentially downscaled images based on the first downscaled version. The second stage processing circuitry processes the first downscaled version and the downscaled images to generate a processed version of the first downscaled version. The unscaled single color high frequency component and the processed version of the first downscaled version of the image are merged to generate a processed version of the image.

20 Claims, 7 Drawing Sheets

(56) References Cited

U.S. PATENT DOCUMENTS

| | | |
|---|---|---|
| 2010/0182452 A1 | 7/2010 | Utsugi |
| 2010/0183240 A1 | 7/2010 | Hiraga et al. |
| 2010/0253811 A1 | 10/2010 | On |
| 2011/0032392 A1 | 2/2011 | Litvinov et al. |
| 2011/0102647 A1 | 5/2011 | Kim et al. |
| 2012/0082243 A1 | 4/2012 | Baylon et al. |
| 2012/0229460 A1 | 9/2012 | Fortin |
| 2015/0188588 A1 | 7/2015 | Groh |
| 2016/0065864 A1 | 3/2016 | Guissin |
| 2017/0132754 A1 | 5/2017 | Mody et al. |
| 2017/0150164 A1 | 5/2017 | Yasugi et al. |
| 2017/0178293 A1 | 6/2017 | Marcos et al. |
| 2018/0315172 A1 | 11/2018 | Smirnov et al. |
| 2020/0005122 A1 | 1/2020 | Fan et al. |

FIG. 7

TWO STAGE MULTI-SCALE PROCESSING OF IMAGE DATA

CROSS REFERENCE TO RELATED APPLICATIONS

This application is a continuation of pending U.S. application Ser. No. 16/100,823, filed Aug. 10, 2018, which is incorporated by reference in its entirety.

BACKGROUND

1. Field of the Disclosure

The present disclosure relates to a circuit for processing images and more specifically to two stage multi-scale processing of image data.

2. Description of the Related Arts

Image data captured by an image sensor or received from other data sources is often processed in an image processing pipeline before further processing or consumption. For example, raw image data may be corrected, filtered, or otherwise modified before being provided to subsequent components such as a video encoder. To perform corrections or enhancements for captured image data, various components, unit stages or modules may be employed.

Such an image processing pipeline may be structured so that corrections or enhancements to the captured image data can be performed in an expedient way without consuming other system resources. Although many image processing algorithms may be performed by executing software programs on central processing unit (CPU), execution of such programs on the CPU would consume significant bandwidth of the CPU and other peripheral resources as well as increase power consumption. Hence, image processing pipelines are often implemented as a hardware component separate from the CPU and dedicated to perform one or more image processing algorithms.

SUMMARY

Embodiments relate to two-stage multi-scale processing of image signal data. First stage processing circuitry receives an image of a plurality of color components and generates an unscaled single color version of the received image. The first stage processing circuitry then performs noise reduction and sub-band splitting to generate an unscaled single color high frequency component, based in part on the unscaled single color version. A scaler circuit coupled to the first stage processing circuitry generates a first downscaled version of the received image that is passed onto second stage processing circuitry. The first downscaled version includes the plurality of color components and has a first pixel resolution lower than a pixel resolution of the received image. The second stage processing circuitry processes the first downscaled version of the received image. The second stage processing circuitry further generates a plurality of sequentially downscaled images based on the first downscaled version, each of the sequentially downscaled images of the plurality of color components. The second stage processing circuitry also processes the plurality of sequentially downscaled images to generate processed versions of sequentially downscaled images. The second stage processing circuitry then generates a processed version of the first downscaled version of the received image using the processed first downscaled version and the processed versions of sequentially downscaled images. The processed version of the first downscaled version is merged with the unscaled single color high frequency component to generate a processed version of the received image.

The figures depict, and the detail description describes, various non-limiting embodiments for purposes of illustration only.

DETAILED DESCRIPTION

Reference will now be made in detail to embodiments, examples of which are illustrated in the accompanying drawings. In the following detailed description, numerous specific details are set forth in order to provide a thorough understanding of the various described embodiments. However, the described embodiments may be practiced without these specific details. In other instances, well-known methods, procedures, components, circuits, and networks have not been described in detail so as not to unnecessarily obscure aspects of the embodiments.

Embodiments of the present disclosure relate to two stage multi-scale processing of an input image having a plurality of color components. First stage processing circuitry generates an unscaled single color version of the input image that undergoes noise reduction and is used to generate an unscaled single color high frequency component of the input image. The second stage processing circuitry generates a plurality of sequentially downscaled images based on a downscaled version of the input image. The second stage processing circuitry performs processing (e.g., noise reduction, local tone mapping, and/or local contrast enhancement) of the downscaled version and of the sequentially downscaled images to generate a processed version of the first downscaled version of the input image. The unscaled single color high frequency component generated by the first stage processing circuitry and the processed version of the downscaled version generated by the second stage processing circuitry are merged to generate a processed version of the input image having a pixel resolution same as a pixel resolution of the input image.

Exemplary Electronic Device

Embodiments of electronic devices, user interfaces for such devices, and associated processes for using such devices are described. In some embodiments, the device is a portable communications device, such as a mobile telephone, that also contains other functions, such as personal digital assistant (PDA) and/or music player functions. Exemplary embodiments of portable multifunction devices include, without limitation, the iPhone®, iPod Touch®, Apple Watch®, and iPad® devices from Apple Inc. of Cupertino, Calif. Other portable electronic devices, such as wearables, laptops or tablet computers, are optionally used. In some embodiments, the device is not a portable communications device, but is a desktop computer or other computing device that is not designed for portable use. In some embodiments, the disclosed electronic device may include a touch sensitive surface (e.g., a touch screen display and/or a touch pad). An example electronic device described below in conjunction with FIG. 1 (e.g., device 100) may include a touch-sensitive surface for receiving user input. The electronic device may also include one or more other physical user-interface devices, such as a physical keyboard, a mouse and/or a joystick.

Figure 1:
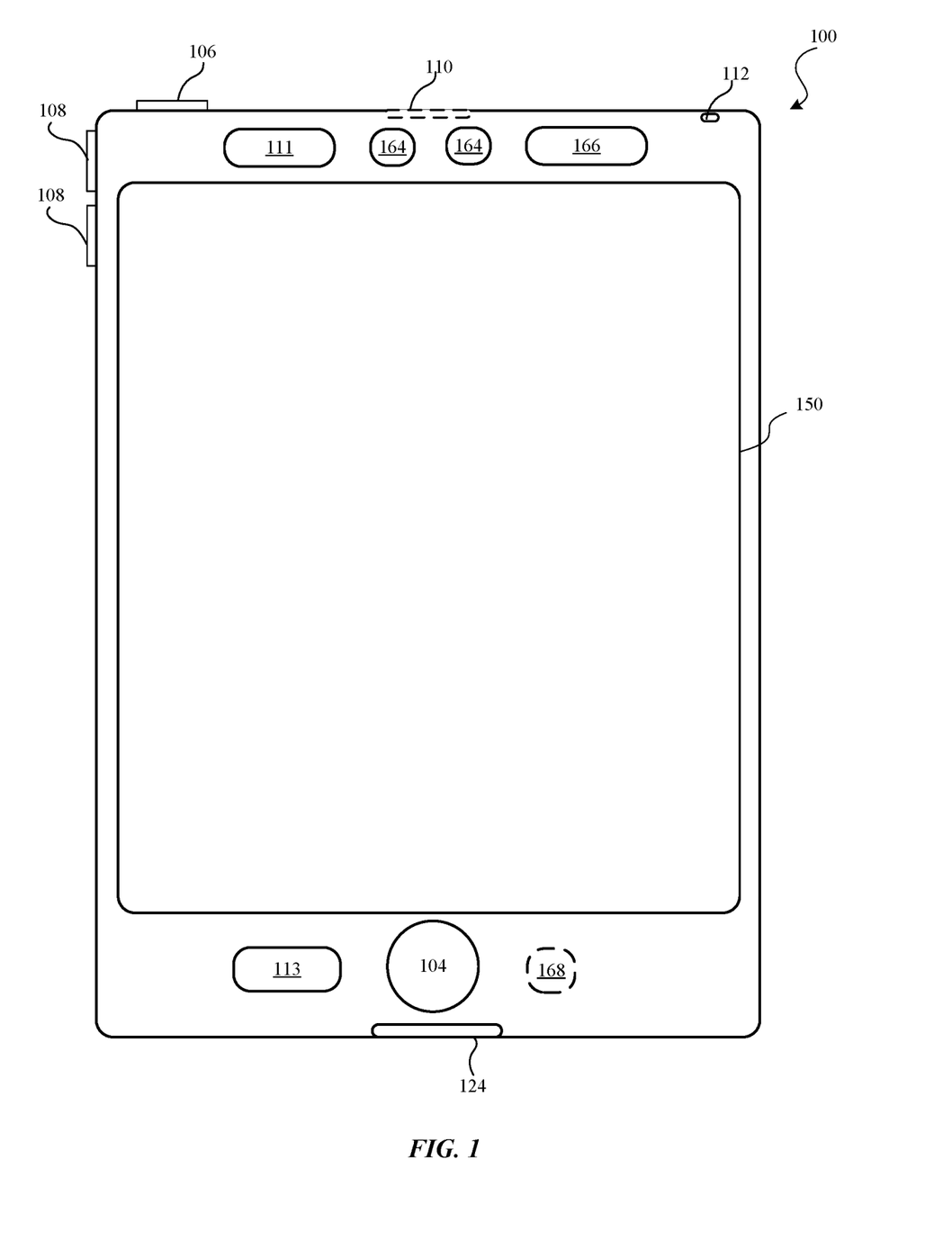
FIG. 1 is a high-level diagram of an electronic device, according to one embodiment.

Figure (FIG.) 1 is a high-level diagram of an electronic device 100, according to one embodiment. Device 100 may include one or more physical buttons, such as a "home" or menu button 104. Menu button 104 is, for example, used to navigate to any application in a set of applications that are executed on device 100. In some embodiments, menu button 104 includes a fingerprint sensor that identifies a fingerprint on menu button 104. The fingerprint sensor may be used to determine whether a finger on menu button 104 has a fingerprint that matches a fingerprint stored for unlocking device 100. Alternatively, in some embodiments, menu button 104 is implemented as a soft key in a graphical user interface (GUI) displayed on a touch screen.

In some embodiments, device 100 includes touch screen 150, menu button 104, push button 106 for powering the device on/off and locking the device, volume adjustment buttons 108, Subscriber Identity Module (SIM) card slot 110, head set jack 112, and docking/charging external port 124. Push button 106 may be used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. The device 100 includes various components including, but not limited to, a memory (which may include one or more computer readable storage mediums), a memory controller, one or more central processing units (CPUs), a peripherals interface, an RF circuitry, an audio circuitry, speaker 111, microphone 113, input/output (I/O) subsystem, and other input or control devices. Device 100 may include one or more image sensors 164, one or more proximity sensors 166, and one or more accelerometers 168. The device 100 may include components not shown in FIG. 1.

Device 100 is only one example of an electronic device, and device 100 may have more or fewer components than listed above, some of which may be combined into a components or have a different configuration or arrangement. The various components of device 100 listed above are embodied in hardware, software, firmware or a combination thereof, including one or more signal processing and/or application specific integrated circuits (ASICs).

Figure 2:
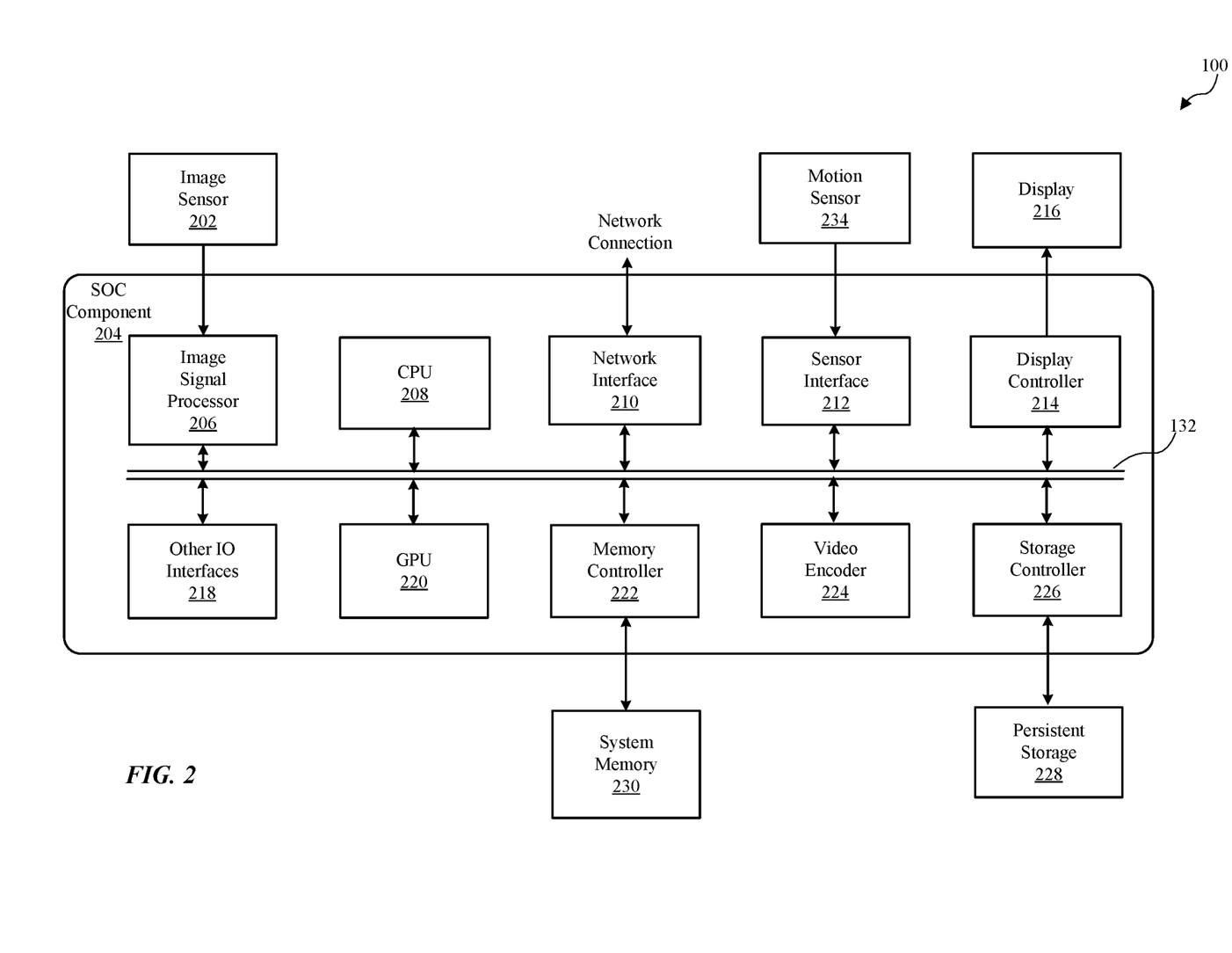
FIG. 2 is a block diagram illustrating components in the electronic device, according to one embodiment.

FIG. 2 is a block diagram illustrating components in device 100, according to one embodiment. Device 100 may perform various operations including image processing. For this and other purposes, the device 100 may include, among other components, image sensor 202, system-on-a chip (SOC) component 204, system memory 230, persistent storage (e.g., flash memory) 228, orientation sensor 234, and display 216. The components as illustrated in FIG. 2 are merely illustrative. For example, device 100 may include other components (such as speaker or microphone) that are not illustrated in FIG. 2. Further, some components (such as orientation sensor 234) may be omitted from device 100.

Image sensor 202 is a component for capturing image data and may be embodied, for example, as a complementary metal-oxide-semiconductor (CMOS) active-pixel sensor) a camera, video camera, or other devices. Image sensor 202 generates raw image data that is sent to SOC component 204 for further processing. In some embodiments, the image data processed by SOC component 204 is displayed on display 216, stored in system memory 230, persistent storage 228 or sent to a remote computing device via network connection. The raw image data generated by image sensor 202 may be in a Bayer color filter array (CFA) pattern (hereinafter also referred to as "Bayer pattern").

Motion sensor 234 is a component or a set of components for sensing motion of device 100. Motion sensor 234 may generate sensor signals indicative of orientation and/or acceleration of device 100. The sensor signals are sent to SOC component 204 for various operations such as turning on device 100 or rotating images displayed on display 216.

Display 216 is a component for displaying images as generated by SOC component 204. Display 216 may include, for example, liquid crystal display (LCD) device or an organic light emitting diode (OLED) device. Based on data received from SOC component 204, display 116 may display various images, such as menus, selected operating parameters, images captured by image sensor 202 and processed by SOC component 204, and/or other information received from a user interface of device 100 (not shown).

System memory 230 is a component for storing instructions for execution by SOC component 204 and for storing data processed by SOC component 204. System memory 230 may be embodied as any type of memory including, for example, dynamic random access memory (DRAM), synchronous DRAM (SDRAM), double data rate (DDR, DDR2, DDR3, etc.) RAMBUS DRAM (RDRAM), static RAM (SRAM) or a combination thereof. In some embodiments, system memory 230 may store pixel data or other image data or statistics in various formats.

Persistent storage 228 is a component for storing data in a non-volatile manner. Persistent storage 228 retains data even when power is not available. Persistent storage 228 may be embodied as read-only memory (ROM), flash memory or other non-volatile random access memory devices.

SOC component 204 is embodied as one or more integrated circuit (IC) chip and performs various data processing processes. SOC component 204 may include, among other subcomponents, image signal processor (ISP) 206, a central processor unit (CPU) 208, a network interface 210, sensor interface 212, display controller 214, graphics processor (GPU) 220, memory controller 222, video encoder 224, storage controller 226, and various other input/output (I/O) interfaces 218, and bus 232 connecting these subcomponents. SOC component 204 may include more or fewer subcomponents than those shown in FIG. 2.

ISP 206 is hardware that performs various stages of an image processing pipeline. In some embodiments, ISP 206 may receive raw image data from image sensor 202, and process the raw image data into a form that is usable by other subcomponents of SOC component 204 or components of device 100. ISP 206 may perform various image-manipulation operations such as image translation operations, horizontal and vertical scaling, color space conversion and/or image stabilization transformations, as described below in detail with reference to FIG. 3.

CPU 208 may be embodied using any suitable instruction set architecture, and may be configured to execute instructions defined in that instruction set architecture. CPU 208 may be general-purpose or embedded processors using any of a variety of instruction set architectures (ISAs), such as the x86, PowerPC, SPARC, RISC, ARM or MIPS ISAs, or any other suitable ISA. Although a single CPU is illustrated in FIG. 2, SOC component 204 may include multiple CPUs. In multiprocessor systems, each of the CPUs may commonly, but not necessarily, implement the same ISA.

Graphics processing unit (GPU) 220 is graphics processing circuitry for performing graphical data. For example, GPU 220 may render objects to be displayed into a frame buffer (e.g., one that includes pixel data for an entire frame). GPU 220 may include one or more graphics processors that may execute graphics software to perform a part or all of the graphics operation, or hardware acceleration of certain graphics operations.

I/O interfaces 218 are hardware, software, firmware or combinations thereof for interfacing with various input/output components in device 100. I/O components may include devices such as keypads, buttons, audio devices, and sensors such as a global positioning system. I/O interfaces 218 process data for sending data to such I/O components or process data received from such I/O components.

Network interface 210 is a subcomponent that enables data to be exchanged between devices 100 and other devices via one or more networks (e.g., carrier or agent devices). For example, video or other image data may be received from other devices via network interface 210 and be stored in system memory 230 for subsequent processing (e.g., via a back-end interface to image signal processor 206, such as discussed below in FIG. 3) and display. The networks may include, but are not limited to, Local Area Networks (LANs) (e.g., an Ethernet or corporate network) and Wide Area Networks (WANs). The image data received via network interface 210 may undergo image processing processes by ISP 206.

Sensor interface 212 is circuitry for interfacing with motion sensor 234. Sensor interface 212 receives sensor information from motion sensor 234 and processes the sensor information to determine the orientation or movement of the device 100.

Display controller 214 is circuitry for sending image data to be displayed on display 216. Display controller 214 receives the image data from ISP 206, CPU 208, graphic processor or system memory 230 and processes the image data into a format suitable for display on display 216.

Memory controller 222 is circuitry for communicating with system memory 230. Memory controller 222 may read data from system memory 230 for processing by ISP 206, CPU 208, GPU 220 or other subcomponents of SOC component 204. Memory controller 222 may also write data to system memory 230 received from various subcomponents of SOC component 204.

Video encoder 224 is hardware, software, firmware or a combination thereof for encoding video data into a format suitable for storing in persistent storage 128 or for passing the data to network interface 210 for transmission over a network to another device.

In some embodiments, one or more subcomponents of SOC component 204 or some functionality of these subcomponents may be performed by software components executed on ISP 206, CPU 208 or GPU 220. Such software components may be stored in system memory 230, persistent storage 228 or another device communicating with device 100 via network interface 210.

Image data or video data may flow through various data paths within SOC component 204. In one example, raw image data may be generated from the image sensor 202 and processed by ISP 206, and then sent to system memory 230 via bus 232 and memory controller 222. After the image data is stored in system memory 230, it may be accessed by video encoder 224 for encoding or by display 116 for displaying via bus 232.

In another example, image data is received from sources other than the image sensor 202. For example, video data may be streamed, downloaded, or otherwise communicated to the SOC component 204 via wired or wireless network. The image data may be received via network interface 210 and written to system memory 230 via memory controller 222. The image data may then be obtained by ISP 206 from system memory 230 and processed through one or more image processing pipeline stages, as described below in detail with reference to FIG. 3. The image data may then be returned to system memory 230 or be sent to video encoder 224, display controller 214 (for display on display 216), or storage controller 226 for storage at persistent storage 228.

Example Image Signal Processing Pipelines

Figure 3:
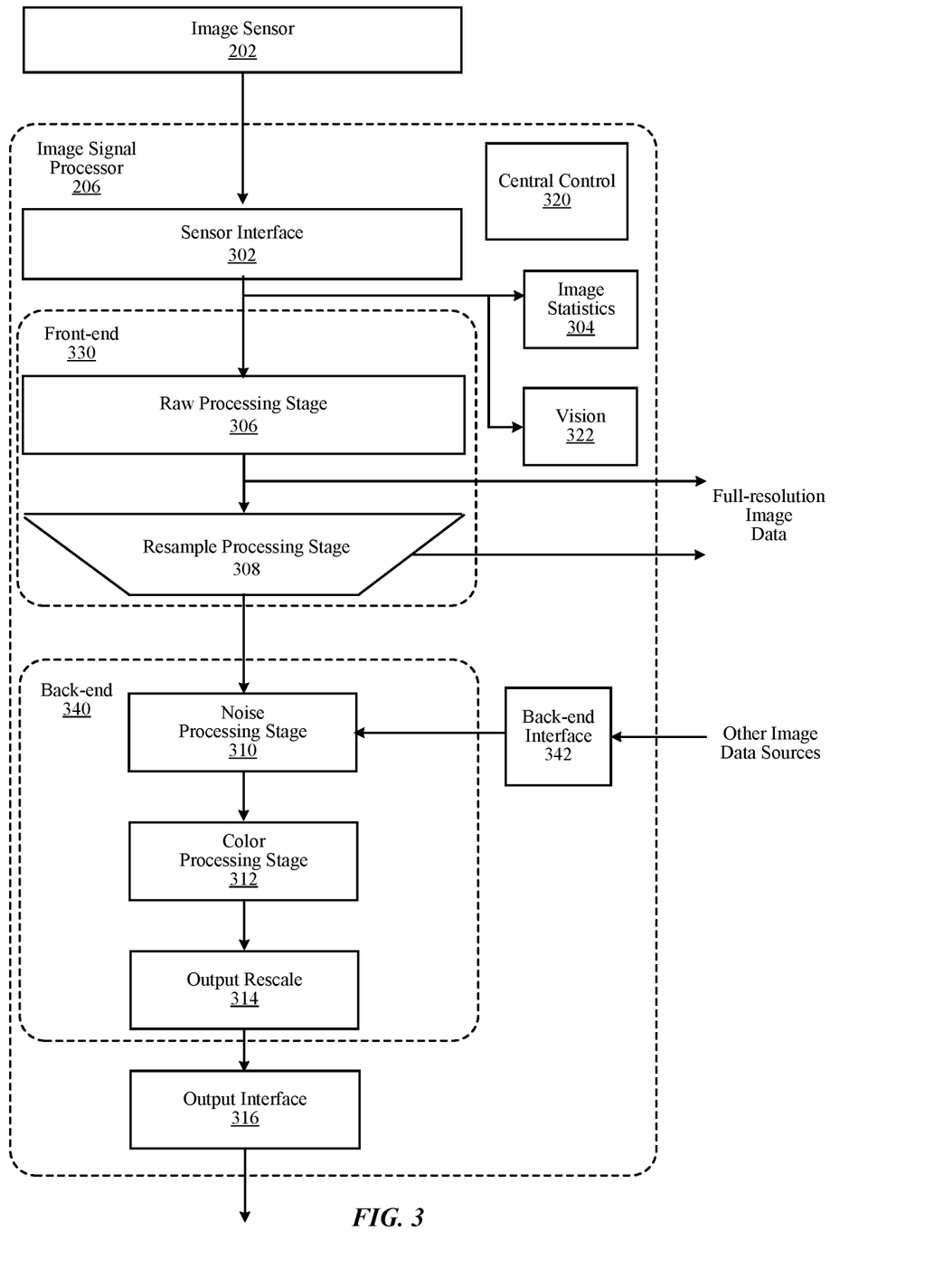
FIG. 3 is a block diagram illustrating image processing pipelines implemented using an image signal processor, according to one embodiment.

FIG. 3 is a block diagram illustrating image processing pipelines implemented using ISP 206, according to one embodiment. In the embodiment of FIG. 3, ISP 206 is coupled to image sensor 202 to receive raw image data. ISP 206 implements an image processing pipeline which may include a set of stages that process image information from creation, capture or receipt to output. ISP 206 may include, among other components, sensor interface 302, central control module 320, front-end pipeline stages 330, back-end pipeline stages 340, image statistics module 304, vision module 322, back-end interface 342, and output interface 316. ISP 206 may include other components not illustrated in FIG. 3 or may omit one or more components illustrated in FIG. 3.

Sensor interface 302 receives raw image data from image sensor 202 and processes the raw image data into an image data processable by other stages in the pipeline. Sensor interface 302 may perform various preprocessing operations, such as image cropping, binning or scaling to reduce image data size. In some embodiments, pixels are sent from the image sensor 202 to sensor interface 302 in raster order (i.e., horizontally, line by line). The subsequent processes in the pipeline may also be performed in raster order and the result may also be output in raster order. Although only a single image sensor and a single sensor interface 302 are illustrated in FIG. 3, when more than one image sensor is provided in device 100, a corresponding number of sensor interfaces may be provided in ISP 206 to process raw image data from each image sensor.

Front-end pipeline stages 330 process image data in raw or full-color domains. Front-end pipeline stages 330 may include, but are not limited to, raw processing stage 306 and resample processing stage 308. A raw image data may be in Bayer raw format, for example. In Bayer raw image format, pixel data with values specific to a particular color (instead of all colors) is provided in each pixel. In an image capturing sensor, image data is typically provided in a Bayer pattern. Raw processing stage 306 may process image data in a Bayer raw format.

The operations performed by raw processing stage 306 include, but are not limited, sensor linearization, black level compensation, fixed pattern noise reduction, defective pixel correction, raw noise filtering, lens shading correction, white balance gain, and highlight recovery. Sensor linearization refers to mapping non-linear image data to linear space for other processing. Black level compensation refers to providing digital gain, offset and clip independently for each color component (e.g., Gr, R, B, Gb) of the image data. Fixed pattern noise reduction refers to removing offset fixed pattern noise and gain fixed pattern noise by subtracting a dark frame from an input image and multiplying different gains to pixels. Defective pixel correction refers to detecting defective pixels, and then replacing defective pixel values. Raw noise filtering refers to reducing noise of image data by averaging neighbor pixels that are similar in brightness. Highlight recovery refers to estimating pixel values for those pixels that are clipped (or nearly clipped) from other channels. Lens shading correction refers to applying a gain per pixel to compensate for a dropoff in intensity roughly proportional to a distance from a lens optical center. White balance gain refers to providing digital gains for white balance, offset and clip independently for all color components (e.g., Gr, R, B, Gb in Bayer format). Components of ISP 206 may convert raw image data into image data in full-color domain, and thus, raw processing stage 306 may process image data in the full-color domain in addition to or instead of raw image data.

Resample processing stage 308 performs various operations to convert, resample, or scale image data received from raw processing stage 306. Operations performed by resample processing stage 308 may include, but not limited to, demosaic operation, per-pixel color correction operation, Gamma mapping operation, color space conversion and downscaling or sub-band splitting. Demosaic operation refers to converting or interpolating missing color samples from raw image data (for example, in a Bayer pattern) to output image data into a full-color domain. Demosaic operation may include low pass directional filtering on the interpolated samples to obtain full-color pixels. Per-pixel color correction operation refers to a process of performing color correction on a per-pixel basis using information about relative noise standard deviations of each color channel to correct color without amplifying noise in the image data. Gamma mapping refers to converting image data from input image data values to output data values to perform special image effects, including black and white conversion, sepia tone conversion, negative conversion, or solarize conversion. For the purpose of Gamma mapping, lookup tables (or other structures that index pixel values to another value) for different color components or channels of each pixel (e.g., a separate lookup table for Y, Cb, and Cr color components) may be used. Color space conversion refers to converting color space of an input image data into a different format. In one embodiment, resample processing stage 308 converts RBD format into YCbCr format for further processing.

Central control module 320 may control and coordinate overall operation of other components in ISP 206. Central control module 320 performs operations including, but not limited to, monitoring various operating parameters (e.g., logging clock cycles, memory latency, quality of service, and state information), updating or managing control parameters for other components of ISP 206, and interfacing with sensor interface 302 to control the starting and stopping of other components of ISP 206. For example, central control module 320 may update programmable parameters for other components in ISP 206 while the other components are in an idle state. After updating the programmable parameters, central control module 320 may place these components of ISP 206 into a run state to perform one or more operations or tasks. Central control module 320 may also instruct other components of ISP 206 to store image data (e.g., by writing to system memory 230 in FIG. 2) before, during, or after resample processing stage 308. In this way full-resolution image data in raw or full-color domain format may be stored in addition to or instead of processing the image data output from resample processing stage 308 through backend pipeline stages 340.

Image statistics module 304 performs various operations to collect statistic information associated with the image data. The operations for collecting statistics information may include, but not limited to, sensor linearization, mask patterned defective pixels, sub-sample raw image data, detect and replace non-patterned defective pixels, black level compensation, lens shading correction, and inverse black level compensation. After performing one or more of such operations, statistics information such as 3A statistics (Auto white balance (AWB), auto exposure (AE), auto focus (AF)), histograms (e.g., 2D color or component) and any other image data information may be collected or tracked. In some embodiments, certain pixels' values, or areas of pixel values may be excluded from collections of certain statistics data (e.g., AF statistics) when preceding operations identify clipped pixels. Although only a single statistics module 304 is illustrated in FIG. 3, multiple image statistics modules may be included in ISP 206. In such embodiments, each statistic module may be programmed by central control module 320 to collect different information for the same or different image data.

Vision module 322 performs various operations to facilitate computer vision operations at CPU 208 such as facial detection in image data. The vision module 322 may perform various operations including pre-processing, global tone-mapping and Gamma correction, vision noise filtering, resizing, keypoint detection, generation of histogram-of-orientation gradients (HOG) and normalized cross correlation (NCC). The pre-processing may include subsampling or binning operation and computation of luminance if the input image data is not in YCrCb format. Global mapping and Gamma correction can be performed on the pre-processed data on luminance image. Vision noise filtering is performed to remove pixel defects and reduce noise present in the image data, and thereby, improve the quality and performance of subsequent computer vision algorithms. Such vision noise filtering may include detecting and fixing dots or defective pixels, and performing bilateral filtering to reduce noise by averaging neighbor pixels of similar brightness. Various vision algorithms use images of different sizes and scales. Resizing of an image is performed, for example, by binning or linear interpolation operation. Keypoints are locations within an image that are surrounded by image patches well suited to matching in other images of the same scene or object. Such keypoints are useful in image alignment, computing cameral pose and object tracking. Keypoint detection refers to the process of identifying such keypoints in an image. HOG provides descriptions of image patches for tasks in image analysis and computer vision. HOG can be generated, for example, by (i) computing horizontal and vertical gradients using a simple difference filter, (ii) computing gradient orientations and magnitudes from the horizontal and vertical gradients, and (iii) binning the gradient orientations. NCC is the process of computing spatial cross correlation between a patch of image and a kernel.

Back-end interface 342 receives image data from other image sources than image sensor 102 and forwards it to other components of ISP 206 for processing. For example, image data may be received over a network connection and be stored in system memory 230. Back-end interface 342 retrieves the image data stored in system memory 230 and provide it to back-end pipeline stages 340 for processing. One of many operations that are performed by back-end interface 342 is converting the retrieved image data to a format that can be utilized by back-end processing stages 340. For instance, back-end interface 342 may convert RGB, YCbCr 4:2:0, or YCbCr 4:2:2 formatted image data into YCbCr 4:4:4 color format.

Back-end pipeline stages 340 processes image data according to a particular full-color format (e.g., YCbCr 4:4:4 or RGB). In some embodiments, components of the back-end pipeline stages 340 may convert image data to a particular full-color format before further processing. Back-end pipeline stages 340 may include, among other stages, noise processing stage 310 and color processing stage 312. Back-end pipeline stages 340 may include other stages not illustrated in FIG. 3.

Noise processing stage 310 performs various operations to reduce noise in the image data. The operations performed by noise processing stage 310 include, but are not limited to, color space conversion, gamma/de-gamma mapping, temporal filtering, noise filtering, luma sharpening, and chroma noise reduction. The color space conversion may convert an image data from one color space format to another color space format (e.g., RGB format converted to YCbCr format). Gamma/de-gamma operation converts image data from input image data values to output data values to perform special image effects. Temporal filtering filters noise using a previously filtered image frame to reduce noise. For example, pixel values of a prior image frame are combined with pixel values of a current image frame. Noise filtering may include, for example, spatial noise filtering. Luma sharpening may sharpen luma values of pixel data while chroma suppression may attenuate chroma to gray (i.e. no color). In one embodiment, the luma sharpening and chroma suppression may be performed simultaneously with spatial nose filtering. The aggressiveness of noise filtering may be determined differently for different regions of an image. Spatial noise filtering may be included as part of a temporal loop implementing temporal filtering. For example, a previous image frame may be processed by a temporal filter and a spatial noise filter before being stored as a reference frame for a next image frame to be processed. In other embodiments, spatial noise filtering may not be included as part of the temporal loop for temporal filtering (e.g., the spatial noise filter may be applied to an image frame after it is stored as a reference image frame (and thus is not a spatially filtered reference frame).

Color processing stage 312 may perform various operations associated with adjusting color information in the image data. The operations performed in color processing stage 312 include, but are not limited to, local tone mapping, local contrast enhancement, gain/offset/clip, color correction, three-dimensional color lookup, gamma conversion, and color space conversion. Local tone mapping refers to spatially varying local tone curves in order to provide more control when rendering an image. For instance, a two-dimensional grid of tone curves (which may be programmed by the central control module 320) may be bi-linearly interpolated such that smoothly varying tone curves are created across an image. In some embodiments, local tone mapping may also apply spatially varying and intensity varying color correction matrices, which may, for example, be used to make skies bluer while turning down blue in the shadows in an image. Local contrast enhancement may be applied to enhance local photometric contrasts in image data. Digital gain/offset/clip may be provided for each color channel or component of image data. Color correction may apply a color correction transform matrix to image data. 3D color lookup may utilize a three dimensional array of color component output values (e.g., R, G, B) to perform advanced tone mapping, color space conversions, and other color transforms. Gamma conversion may be performed, for example, by mapping input image data values to output data values in order to perform gamma correction, tone mapping, or histogram matching. Color space conversion may be implemented to convert image data from one color space to another (e.g., RGB to YCbCr). Other processing techniques may also be performed as part of color processing stage 312 to perform other special image effects, including black and white conversion, sepia tone conversion, negative conversion, or solarize conversion.

Output rescale module 314 may resample, transform and correct distortion on the fly as the ISP 206 processes image data. Output rescale module 314 may compute a fractional input coordinate for each pixel and uses this fractional coordinate to interpolate an output pixel via a polyphase resampling filter. A fractional input coordinate may be produced from a variety of possible transforms of an output coordinate, such as resizing or cropping an image (e.g., via a simple horizontal and vertical scaling transform), rotating and shearing an image (e.g., via non-separable matrix transforms), perspective warping (e.g., via an additional depth transform) and per-pixel perspective divides applied in piecewise in strips to account for changes in image sensor during image data capture (e.g., due to a rolling shutter), and geometric distortion correction (e.g., via computing a radial distance from the optical center in order to index an interpolated radial gain table, and applying a radial perturbance to a coordinate to account for a radial lens distortion).

Output rescale module 314 may apply transforms to image data as it is processed at output rescale module 314. Output rescale module 314 may include horizontal and vertical scaling components. The vertical portion of the design may implement series of image data line buffers to hold the "support" needed by the vertical filter. As ISP 206 may be a streaming device, it may be that only the lines of image data in a finite-length sliding window of lines are available for the filter to use. Once a line has been discarded to make room for a new incoming line, the line may be unavailable. Output rescale module 314 may statistically monitor computed input Y coordinates over previous lines and use it to compute an optimal set of lines to hold in the vertical support window. For each subsequent line, output rescale module may automatically generate a guess as to the center of the vertical support window. In some embodiments, output rescale module 314 may implement a table of piecewise perspective transforms encoded as digital difference analyzer (DDA) steppers to perform a per-pixel perspective transformation between input image data and output image data in order to correct artifacts and motion caused by sensor motion during the capture of the image frame. Output rescale may provide image data via output interface 316 to various other components of system 100, as discussed above with regard to FIGS. 1 and 2.

In various embodiments, the functionally of components 302 through 342 may be performed in a different order than the order implied by the order of these functional units in the image processing pipeline illustrated in FIG. 3, or may be performed by different functional components than those illustrated in FIG. 3. Moreover, the various components as described in FIG. 3 may be embodied in various combinations of hardware, firmware or software.

Example Pipelines Associated with Two-Stage Multi-Scale Noise Processing

Figure 4:
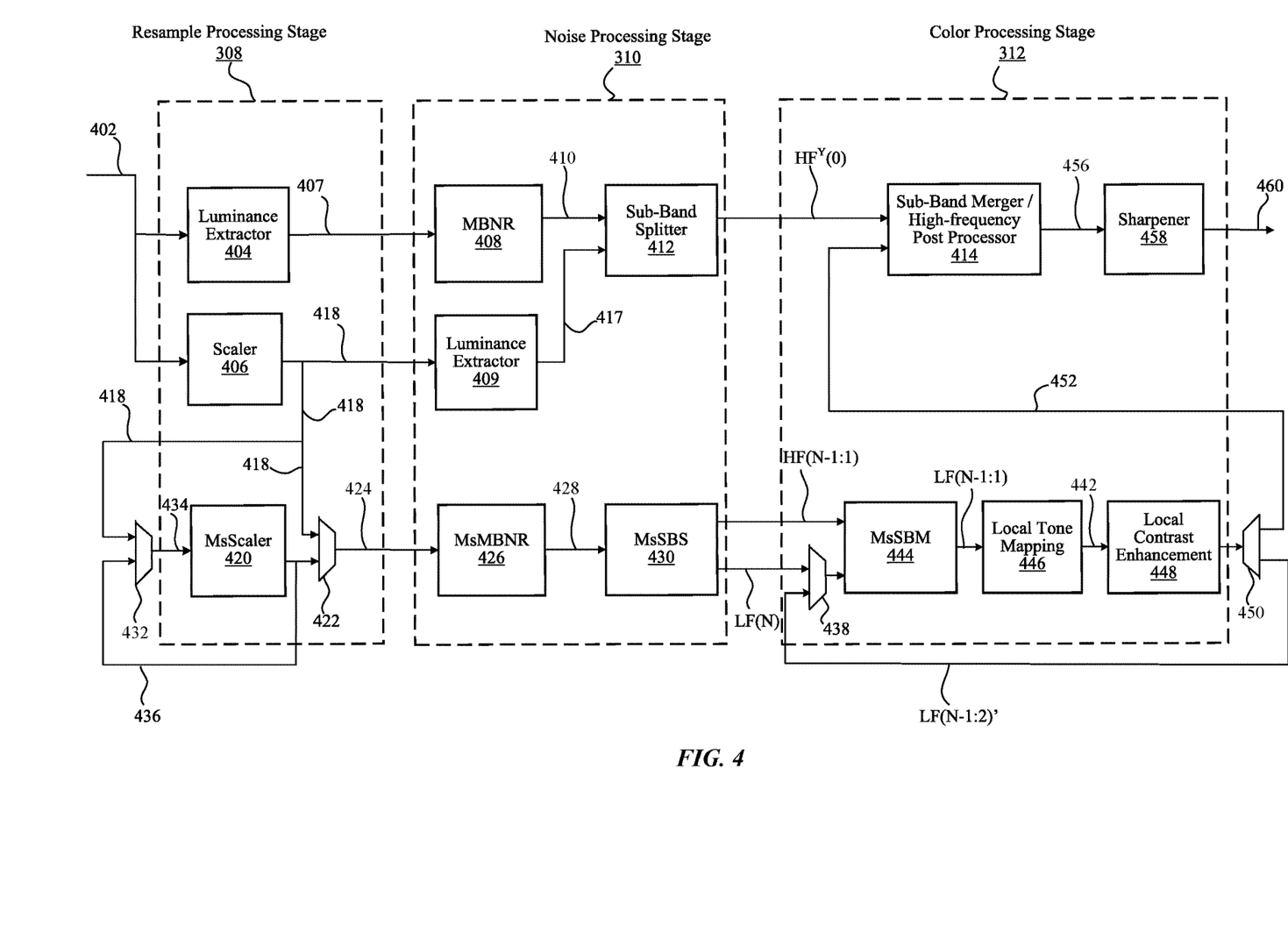
FIG. 4 is a block diagram illustrating a portion of the image processing pipeline including circuitry for two-stage multi-scale processing of image signal data, according to one embodiment.

FIG. 4 is a block diagram illustrating a portion of the image processing pipeline including circuitry for two-stage multi-scale processing of image signal data, according to one embodiment. The circuitry for two-stage multi-scale processing of image signal data illustrated in FIG. 4 spans across resample processing stage 308, noise processing stage 310 and color processing stage 312.

Image 402 generated by raw processing stage 306 in FIG. 3 is input into resample processing stage 308. Image 402 may comprise a plurality of color components (e.g., Y, Cb, Cr color components). In some embodiments, image 402 may represent an unscaled low frequency image component, i.e., LF(0), of full-resolution image data output by raw processing stage 306. Luminance extractor 404 extracts a single color component (e.g., Y color component) from image 402 and generates an unscaled single color version 407 of image 402. The unscaled single color version 407 is fed to multiple band noise reduction (MBNR) circuit 408 for noise reduction. MBNR circuit 408 performs noise reduction on multiple bands of the unscaled single color version 407 to generate a noise reduced version 410 of the unscaled single color version 407 that is fed to sub-band splitter (SBS) circuit 412.

Scaler 406 generates a first downscaled version 418 of image 402. The first downscaled version 418 comprises the same color components as the image 402 and have a first pixel resolution lower than a pixel resolution of image 402. The first downscaled version 418 may be also referred to as a first downscaled low frequency image component LF(1). The first downscaled version 418 is passed onto luminance extractor 409 that extracts a single color component (e.g., Y color component) from the first downscaled version 418 to generate a first downscaled single color version 417 that is also fed to SBS circuit 412.

SBS circuit 412 generates an unscaled single color high frequency image component $HF^Y(0)$ including only one color component (e.g., Y color component), by using the noise reduced version 410 of the unscaled single color version 407 and the first downscaled single color version 417. The single color high frequency image component $HF^Y(0)$ may be then passed to sub-band merger (SBM)/high-frequency post processor (HPP) circuit 414 for sub-band merging and post processing (e.g., local tone mapping, luminance adjustment, etc.). Additional details regarding HPP are discussed in U.S. application Ser. No. 15/499,448, filed Apr. 27, 2017, and is herein incorporated by reference in its entirety.

In addition to the high frequency image component $HF^Y(0)$, as a result of recursive processing, resample processing stage 308 and noise processing stage 310 output a series of high frequency image components HF(N−1), HF(−2), ..., HF(1) and a low frequency image component LF(N) derived from image 402, where N represents levels of downsampling performed on image 402, e.g., N=6. For example, HF(1) and LF(2) represent a high frequency image component and a low frequency image component split from the first downscaled version 418, respectively, while HF(2) and LF(3) represent a high frequency image component and a low frequency image component split from a second downscaled low frequency component of image 402, respectively, and so on. The second downscaled low frequency component has a pixel resolution lower than a pixel resolution of the first downscaled version 418.

The first downscaled version 418 is also fed, as image data 424 via a multiplexer 422, to multi-scale multiple band noise reduction (MsMBNR) circuit 426 for noise reduction. MsMBNR circuit 426 performs noise reduction on multiple bands of the image data 424 comprising the first downscaled version 418 to generate a noise reduced version 428 passed onto multi-scale sub-band splitter (MsSBS) circuit 430. MsSBS circuit 430 splits the noise reduced version 428 into a high frequency image component HF(1) and a low frequency image component LF(2). The high frequency image component HF(1) is passed onto multi-scale sub-band merger (MsSBM) circuit 444.

The first downscaled version 418 is also fed, as image data 434 via a multiplexer 432, to multi-scale scaler (MsScaler) 420. MsScaler 420 generates a downscaled version 436 that is fed back via the multiplexer 432 to MsScaler 420 for further downscaling. The downscaled version 436 representing a low frequency image component LF(2) is also passed onto MsMBNR circuit 426 via the multiplexer 422 as image data 424 for noise reduction. MsMBNR circuit 426 performs noise reduction to generate a noise reduced version 428 of the downscaled version 436 and sends the noise reduced version 428 to MsSBS circuit 430 to again split the noise reduced version 428 into a high frequency image component HF(2) and a low frequency image component LF(3). The high frequency image component HF(2) is sent to MsSBM circuit 444. The process of generating a high frequency image component HF(N−1) and a low frequency image component LF(N) is repeated until the final level of band-splitting is performed by MsSBM circuit 430. When the final level of band-splitting is reached, the low frequency image component LF(N) is passed through a multiplexer 438 to MsSBM circuit 444.

MsScaler 420 generates a plurality of sequentially downscaled images 436 that are passed via the multiplexer 422 as image data 424 onto MsMBNR circuit 426, wherein each of the sequentially downscaled images 436 comprises the plurality of color components. MsMBNR circuit 426 performs noise reduction on multiple bands of each of sequentially downscaled images 424 to generate a noise reduced version 428 of each of the sequentially downscaled images 424 passed onto MsSBS circuit 430. MsSBS circuit 430 splits the noise reduced version 428 of each of the sequentially downscaled images 424 into a downscaled high frequency image component and a downscaled low frequency image component for each of the sequentially downscaled images 424.

Figure 5:
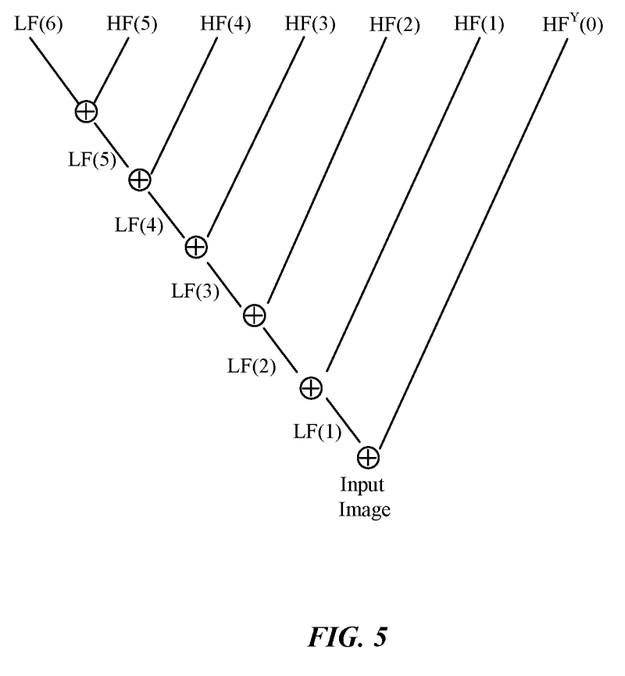
FIG. 5 is a conceptual diagram illustrating recursively sub-band splitting an input image, according to one embodiment.

FIG. 5 is a conceptual diagram illustrating recursively sub-band splitting the original input image 402, according to one embodiment. In the example of FIG. 5, input image 402 is sub-band split 6 times by resample processing stage 308. In addition, a single color component (e.g., Y color component) from input image 402 is extracted. First, input image 402 at the bottom of FIG. 5 is passed to luminance extractor 404 to generate the unscaled single color version 407 of input image 402 that is split (after noise reduction) into an unscaled single color high frequency image component $HF^Y(0)$. The sub-band image component $HF^Y(0)$ is passed on from noise processing stage 310 to color processing stage 312 for post-processing and merging with other sub-band components.

In addition, input image 402 at the bottom of FIG. 5 is downscaled to generate the first downscaled version 418 of the input image 402 that corresponds to a first downscaled low frequency image component LF(1). The first downscaled version 418, after going through noise reduction process, splits into HF(1) and LF(2). The first downscaled version 418 (i.e., LF(1)) is also downscaled into second downscaled version (i.e., LF(2)) which undergoes noise reduction process and again splits into HF(2) and LF(3), which again undergoes downscaling and noise reduction process and splits into HF(3) and LF(2), and so on. The sub-band image components HF(1) through HF(5) and LF(6) generated by noise processing stage 310 are passed to color processing stage 312, i.e., to MsSBM circuit 444 in FIG. 4. The sub-band image components HF(1) through HF(5) may include interpolation guidance signals used during merging process by the MsSBM circuit 444. Additional details regarding interpolation guidance are discussed in U.S. application Ser. No. 15/499,448, filed Apr. 27, 2017, and is herein incorporated by reference in its entirety.

Note that connection between the noise processing stage 310 and the color processing stage 312 shown in FIG. 4 (i.e., connection between MsSBS circuit 430 and MsSBM circuit 444) may not be a direct connection, but rather connection through the system memory 230 or some other memory module (e.g., a cache memory), not shown in FIG. 4. The processing scheme supported by circuitry illustrated in FIG. 4 allows for partial frame buffering. Thus, a memory between the noise processing stage 310 and the color processing stage 312 can be of enough size to cover image pyramid re-ordering, i.e., downscaling of images performed by the resample processing stage 308 and assembling in the reverse order performed by the color processing stage 312, while taking into account latencies of processing circuits that affect the downscaling/reassembly process (e.g., latencies of MsMBNR circuit 426, MsSBS circuit 430, MsSBM circuit 444, etc.). For example, the memory between the noise processing stage 310 and the color processing stage 312 for storing of sub-band image components (e.g., HF(1) through HF(5) and LF(6) image components) can have the size of approximately 3 Mbytes.

Referring back to FIG. 4 in the context of FIG. 5, HF(1) through HF(N−1) and LF(N) are generated at the output of noise processing stage 310. MsSBM circuit 444 receives a high frequency image component HF(N−1) and a low frequency image component LF(N) (via a multiplexer 438). MsSBM circuit 444 merges the high frequency image component HF(N−1) and the low frequency image component LF(N) to generate a low frequency image component LF(N−1). Local tone mapping (LTM) circuit 446 may then apply local tone mapping on the low frequency image component LF(N−1) to generate image data 442. Local contrast enhancement (LCE) circuit 448 may then perform local photometric contrast enhancement on the image data 442 to generate a processed low frequency image component LF(N−1)'.

As shown in FIG. 4, the processed low frequency image component LF(N−1)' is fed back to MsSBM circuit 444 via a demultiplexer 450 and the multiplexer 438 for merging with the high frequency image component HF(N−2) to generate a low frequency image component LF(N−2). A processed low frequency image component LF(N−2)' may be further generated after processing the low frequency image component LF(N−2) by LTM circuit 446 and LCE circuit 448. The process of combining a high frequency image component and a low frequency image component is repeated until MsSBM circuit 444, LTM circuit 446 and LCE circuit 448 generates a processed version 452 of the first downscaled version 418 (i.e., LF(1)') that is output via the demultiplexer 450 to SBM/HPP circuit 414. In some embodiments, LTM circuit 446 and LCE circuit 448 are bypassed for one or more scales of merged image data at the output of MsSBM circuit 444. For example, local tone mapping and local photometric contrast enhancement may be applied by LTM circuit 446 and LCE circuit 448 only to the low frequency image component LF(1) before generating the processed version 452 of the first downscaled version 418, i.e., LF(1)'.

SBM/HPP circuit 414 processes high frequencies while merging the unscaled single color high frequency image component $HF^Y(0)$ and the processed version 452 of the first downscaled version 418 to generate merged image data 456 having the plurality of color components. In one embodiment, SBM/HPP circuit 414 merges the unscaled single color high frequency image component $HF^Y(0)$ and the processed version 452 of the first downscaled version 418 without chroma upscaling to generate merged image data 456 in 4:2:0 YCbCr format. In other embodiment, SBM/HPP circuit 414 merges the unscaled single color high frequency image component $HF^Y(0)$ and the processed version 452 of the first downscaled version 418 while also performing chroma upscaling, as described in U.S. application Ser. No. 15/499,448, filed Apr. 27, 2017, to generate merged image data 456 in 4:4:4 YCbCr format. The merged image data 456 are passed onto a sharpener circuit 458 that performs sharpening (i.e., photometric contrast enhancement) on a single color component (e.g., Y color component) of the merged image data 456 to generate a processed version 460 of image 402. The processed version 460 of image 402 may be then passed onto output rescale module 314 in FIG. 3.

In an alternative embodiment, image 402 is directly fed to MBNR circuit 408 for noise reduction, and the output of MBNR circuit 408 is then passed onto luminance extractor 404 for extracting a single color component. The output of MBNR circuit 408 is also passed onto scaler 406 for generating a first downscaled version of image 402 that is fed to MsMBNR circuit 426 and MsScaler 420 for noise reduction and downscaling. Furthermore, in this embodiment, MsMBNR circuit 426 may be instantiated between the multiplexer 432 and MsScaler 420 for performing noise reduction before downscaling in MsScaler 420.

Example Architecture of Scaler and Multi-Scale Scaler Circuitry

Figure 6A:
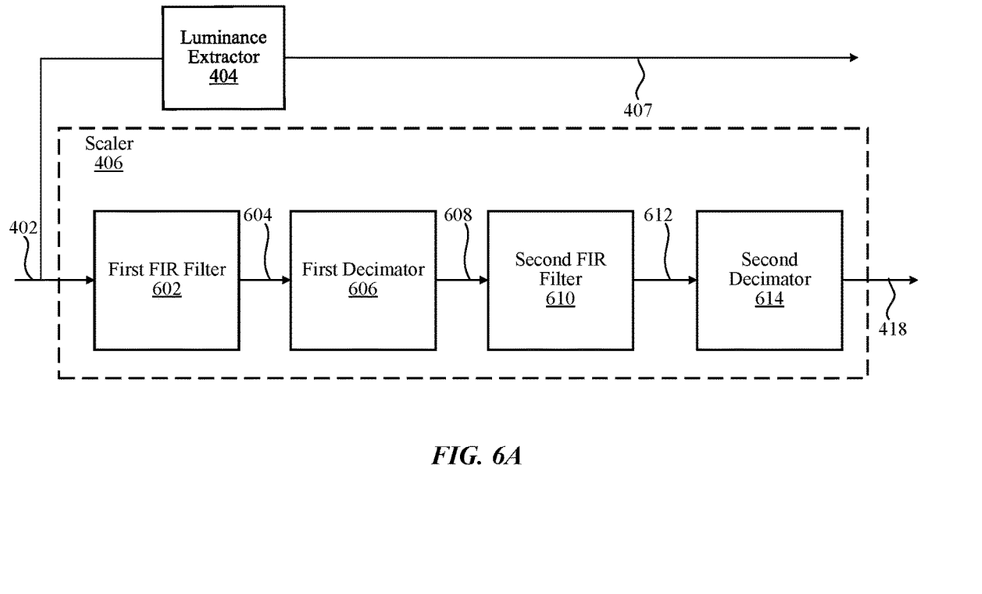
FIG. 6A is a block diagram illustrating circuitry for extracting a single color component of an input image and for generating a first downscaled version of the input image, according to one embodiment.

FIG. 6A is a block diagram illustrating luminance extractor 404 for extracting Y color component from image 402 and scaler 406 for generating the first downscaled version 418 of image 402, according to one embodiment. Luminance extractor 404 receives image 402 comprising a plurality of color components (e.g., Y, Cb, Cr color components). For example, image 402 may be in 4:4:4 YCbCr format. Luminance extractor 404 extracts a single color component (e.g., Y color component) of image 402 and generates the unscaled single color version 407.

Scaler 406 generates the first downscaled version 418 by decimating image 402 along at least one dimension. Scaler 406 includes a first Finite Impulse Response (FIR) filter 602, a first decimator 606, a second FIR filter 610 and a second decimator 614. The first FIR filter 602 performs filtering of image 402 (e.g., along horizontal dimension of image 402) using a first kernel to generate a first filtered image 604 passed onto the first decimator 606. The first kernel may be of size 1×1, 1×3, 1×5, 1×7, or any other suitable size. Coefficients and sizes of the first kernel can be independently configurable for each color component of image 402. The first decimator 606 performs decimation (e.g., 2:1 decimation) of the first filtered image 604 along a first dimension (e.g., horizontal dimension) to generate a first decimated image 608 passed onto the second FIR filter 610. The second FIR filter 610 performs filtering of the first decimated image 608 (e.g., along vertical dimension of the first decimated image 608) using a second kernel different from the first kernel to generate a second filtered image 612 passed onto the second decimator 614. The second kernel may be of size 1×1, 3×1, 5×1, 7×1, or any other suitable size. Coefficients and sizes of the second kernel can be independently configurable for each color component of the first decimated image 608. The second decimator 614 performs decimation (e.g., 2:1 decimation) of the second filtered image 612 along a second dimension (e.g., vertical dimension) to generate the first downscaled version 418 of image 402. A pixel resolution of the first downscaled version 418 is lower than a pixel resolution of image 402, e.g., four times lower.

Figure 6B:
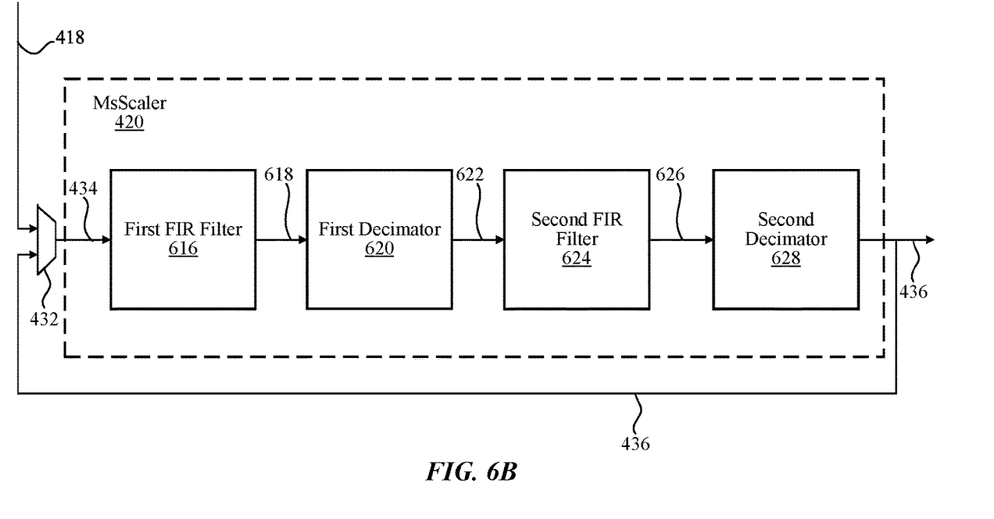
FIG. 6B is a block diagram illustrating a multi-scale scaler for generating a plurality of sequentially downscaled images using the first downscaled version of the input image, according to one embodiment.

FIG. 6B is a block diagram illustrating MsScaler 420 for generating a plurality of sequentially downscaled images using a first downscaled version of image 402, according to one embodiment. MsScaler 420 generates the plurality of sequentially downscaled images 424 in recursive manner, based on the first downscaled version 418 generated by scaler 406.

The first downscaled version 418 generated by scaler 406 is fed, via the multiplexer 432 as downscaled image data 434, to MsScaler 420 for further downscaling. The image data 434 may include a low frequency image component LF(1) comprising the plurality of color components. MsScaler 420 includes a first FIR filter 616, a first decimator 620, a second FIR filter 624 and a second decimator 628. The first FIR filter 616 receives the downscaled image data 434, and performs filtering of the downscaled image data 434 (e.g., along horizontal dimension) using a first kernel to generate a first filtered downscaled image 618 passed onto the first decimator 620. The first kernel may be of size 1×1, 1×3, 1×5, 1×7, or any other suitable size. Coefficients and sizes of the first kernel can be independently configurable for each scale and color component of the low frequency component image data 434. The first decimator 620 performs decimations (e.g., 2:1 decimation) of the first filtered downscaled image 618 along a first dimension (e.g., horizontal dimension) to generate a first decimated downscaled image 622 passed onto the second FIR filter 624. The second FIR filter 624 performs filtering of the first decimated downscaled image 622 (e.g., along vertical dimension) using a second kernel different from the first kernel to generate a second filtered downscaled image 626 passed onto the second decimator 628. The second kernel may be of size 1×1, 3×1, 5×1, 7×1, or any other suitable size. Coefficients and sizes of the second kernel can be independently configurable for each scale and color component of the first decimated downscaled image 622. The second decimator 628 performs decimation (e.g., 2:1 decimation) of the second filtered downscaled image 626 along a second dimension (e.g., vertical dimension) to generate one of the plurality of sequentially downscaled images 436. The downscaled image 436 is fed back as the downscaled image data 434 to MsScaler 420 via the multiplexer 432 for further sequential (recursive) downscaling.

Example Process for Performing Two-Stage Multi-Scale Noise Reduction

Figure 7:
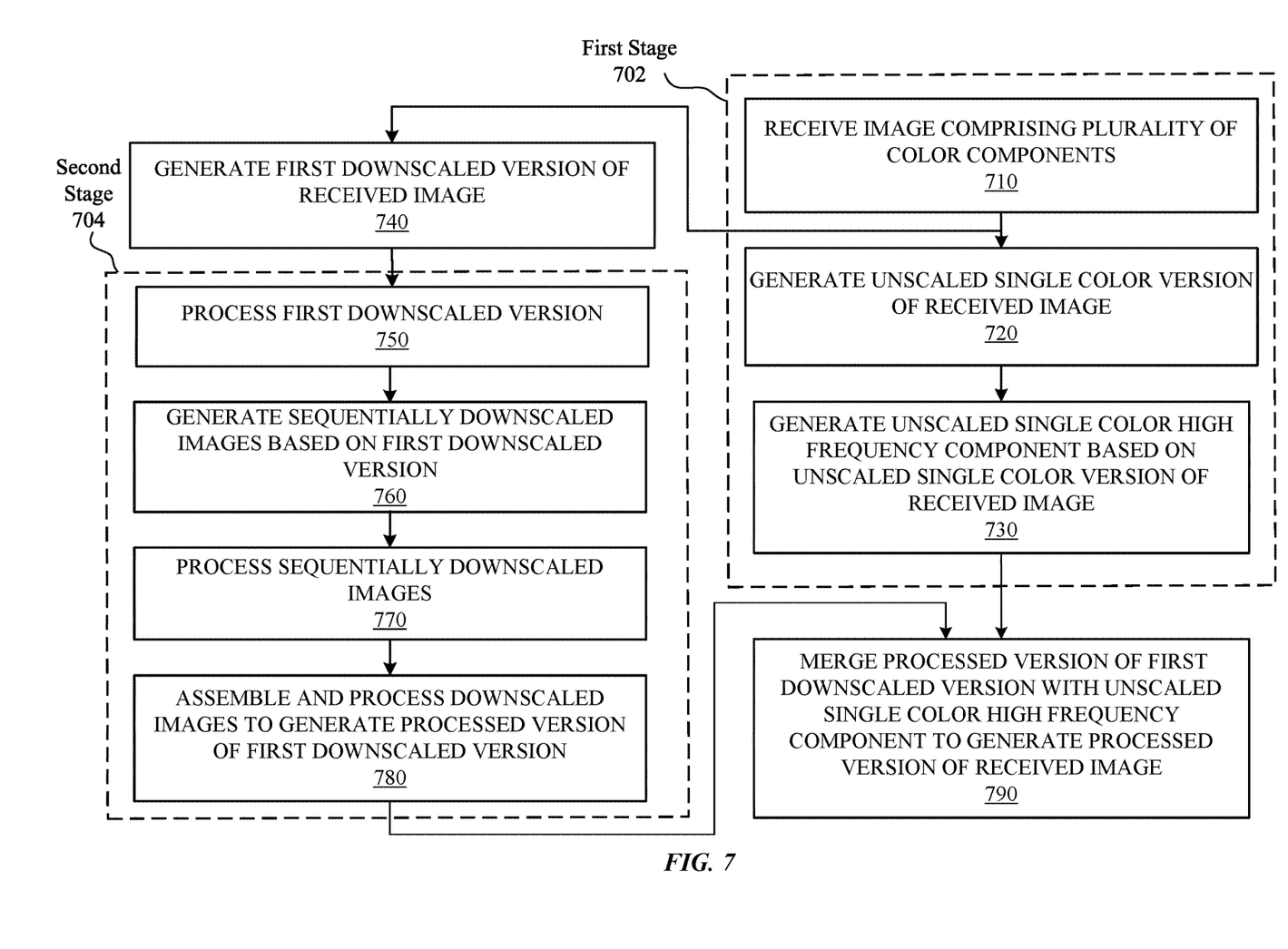
FIG. 7 is a flowchart illustrating a method of two-stage multi-scale processing of image signal data, according to one embodiment.

FIG. 7 is a flowchart illustrating a method of two-stage multi-scale processing of image signal data, according to one embodiment. The method may include additional or fewer steps, and steps may be performed in different orders. Steps 710, 720, 730 in FIG. 7 can be performed by first stage processing circuitry 702. Referring back to FIG. 4, first stage processing circuitry 702 may include luminance extractor 404, MBNR circuit 408, and SBS circuit 412. Steps 750, 760, 780 in FIG. 7 can be performed by second stage processing circuitry 704. Referring back to FIG. 4, second stage processing circuitry 704 may include MsScaler 420, MsMBNR circuit 426, MsSBS circuit 430, MsSBM circuit 444, LTM circuit 446 and LCE circuit 448. Scaler 406, luminance extractor 409 and SBM/HPP circuit 414 are coupled to both first stage processing circuitry 702 and second stage processing circuitry 704.

Resample processing stage 308 receives 710 an image comprising a plurality of color components (e.g., Y, Cb and Cr color components). Luminance extractor 404 generates 720 an unscaled single color version of the received image. The unscaled single color version of the received image may comprise, e.g., Y color component. The unscaled single color version of the received image undergoes noise reduction, e.g., by MBNR circuit 408 before being passed to SBS circuit 412. SBS circuit 412 generates 730 an unscaled single color high frequency component based in part on the unscaled single color version of the received image.

Scaler 406 receives the image having the plurality of color components and generates 740 a first downscaled version of the received image. The first downscaled version includes the plurality of color components and has a first pixel resolution lower than a pixel resolution of the received image. The first downscaled version of the received image may be passed onto MsMBNR circuit 426 for noise reduction and onto MsScaler 420 for downscaling.

MsMBNR circuit 426 processes 750 the first downscaled version of the received image. MsMBNR circuit 426 performs noise reduction on the first downscaled version of the received image and passed a noise reduced version to MsSBS circuit 430. MsSBS circuit 430 generates a high frequency image component HF(1) using the noise reduced version of the first downscaled version of the received image. The high frequency image component HF(1) is passed onto MsSBM circuit 440.

MsScaler 420 generates 760 a plurality of sequentially downscaled images based on the first downscaled version. Each of the sequentially downscaled images comprises the plurality of color components. MsMBNR circuit 426 and MsSBS circuit 430 process 770 the plurality of sequentially downscaled images to generate processed versions of sequentially downscaled images. MsSBM circuit 444 and optional LTM circuit 446 and LCE circuit 448 perform assembling and processing 780 to generate a processed version of the first downscaled version of the received image using the processed first downscaled version and the processed versions of sequentially downscaled images.

SBM/HPP circuit 414 performs merging 790 (along with high frequency post-processing) of the processed version of the first downscaled version generated at 780 with the unsealed single color high frequency component generated at 730 to generate a processed version of the received image (merged image data) having the plurality of color components and a pixel resolution same as a pixel resolution of the received image. The merged image data can be further processed by the sharpener circuit 458 for sharpening (photometric contrast enhancement) of a single color component of the merged image data.

While particular embodiments and applications have been illustrated and described, it is to be understood that the invention is not limited to the precise construction and components disclosed herein and that various modifications, changes and variations which will be apparent to those skilled in the art may be made in the arrangement, operation and details of the method and apparatus disclosed herein without departing from the spirit and scope of the present disclosure.

What is claimed is:

1. An apparatus for processing image signal data, comprising:
   first stage processing circuitry configured to:
      generate an unscaled single color version of a received image by extracting a single color component from the received image, and
      generate an unscaled single color high frequency component by band splitting the unscaled single color version;
   a scaler circuit configured to generate a first downscaled version of the received image having a first pixel resolution lower than a pixel resolution of the received image; and
   second stage processing circuitry configured to:
      generate multiple downscaled images from the first downscaled version, and
      generate a processed version of the first downscaled version using the first downscaled version and the downscaled images, the processed version of the first downscaled version merged with the unscaled single color high frequency component.

2. The apparatus of claim 1, wherein the scaler circuit is further configured to:
   generate the first downscaled version by decimating the received image along at least one dimension.

3. The apparatus of claim 1, wherein the scaler circuit is further configured to:
   filter the received image using a first kernel to generate a first filtered image;
   decimate the first filtered image along a first dimension to generate a first decimated image;
   filter the first decimated image using a second kernel to generate a second filtered image; and
   decimate the second filtered image along a second dimension to generate the first downscaled version.

4. The apparatus of claim 1, wherein the first stage processing circuitry includes:
   a multi band noise reduction (MBNR) circuit configured to perform noise reduction on multiple bands of the unsealed single color version to generate a noise reduced version of the unsealed single color version; and
   a sub-band splitter (SBS) circuit configured to generate the unsealed single color high frequency component by band splitting the noise reduced version of the unsealed single color version.

5. The apparatus of claim 1, further comprising:
   a post processor circuit configured to merge the unsealed single color high frequency component and the processed version of the first downscaled version to generate a processed version of the received image having multiple color components.

6. The apparatus of claim 1, wherein the second stage processing circuitry includes a multi-scale scaler (MsScaler) configured to:
   receive the first downscaled version from the scaler circuit; and
   generate the downscaled images by recursively downscaling images starting with the first downscaled version.

7. The apparatus of claim 6, wherein the second stage processing circuitry is further configured to feed at least one of the downscaled images back to the MsScaler for further recursive downscaling by the MsScaler.

8. The apparatus of claim 6, wherein the MsScaler is further configured to:
   filter a first of the downscaled images using a first kernel to generate a first filtered downscaled image;
   decimate the first filtered downscaled image along a first dimension to generate a first decimated downscaled image;
   filter the first decimated downscaled image using a second kernel to generate a second filtered downscaled image; and
   decimate the second filtered downscaled image along a second dimension to generate a second of the downscaled images.

9. The apparatus of claim 1, wherein the second stage processing circuitry includes a multi-scale multi band noise reduction (MsMBNR) circuit configured to:
   receive the first downscaled version from the scaler circuit; and
   perform noise reduction on multiple bands of the first downscaled version to generate a noise reduced version of the first downscaled version.

10. The apparatus of claim 9, wherein the second stage processing circuitry further includes a multi-scale sub-band splitter (MsSBS) circuit configured to perform band-splitting of the noise reduced version of the first downscaled version to generate a high frequency component of the noise reduced version of the first downscaled version.

11. The apparatus of claim 1, wherein the second stage processing circuitry includes:
   a multi-scale multi band noise reduction (MsMBNR) circuit configured to perform noise reduction on multiple bands of each of the downscaled images to generate a noise reduced version of each of the downscaled images;
   a multi-scale sub-band splitter (MsSBS) circuit configured to generate a downscaled high frequency component for each of the downscaled images using the noise reduced version of each of the downscaled images; and
   a multi-scale sub-band merger (MsSBM) circuit configured to merge the downscaled high frequency component and a processed version of a corresponding downscaled low frequency component for a corresponding one of the downscaled images to generate another downscaled low frequency component for another one of the downscaled images, the other downscaled low frequency component further used for merging with a corresponding downscaled high frequency component.

12. The apparatus of claim 11, wherein the second stage processing circuitry further includes:
   a local tone mapping circuit configured to perform local tone mapping operation on the other downscaled low frequency component to generate a processed version of the other downscaled low frequency component; and
   a local contrast enhancement circuit configured to perform local photometric contrast enhancement of a single color component of the processed version of the other downscaled low frequency component to generate the processed version of the first downscaled version.

13. A method comprising:
generating an unscaled single color version of a received image by extracting a single color component from the received image;
generating an unscaled single color high frequency component by band splitting the unscaled single color version;
generating a first downscaled version of the received image having a first pixel resolution lower than a pixel resolution of the received image;
generating multiple downscaled images from the first downscaled version;
generating a processed version of the first downscaled version using the first downscaled version and the downscaled images; and
merging the processed version of the first downscaled version with the unscaled single color high frequency component.

14. The method of claim 13, further comprising:
filtering the received image using a first kernel to generate a first filtered image;
decimating the first filtered image along a first dimension to generate a first decimated image;
filtering the first decimated image using a second kernel to generate a second filtered image; and
decimating the second filtered image along a second dimension to generate the first downscaled version.

15. The method of claim 13, further comprising:
performing noise reduction on multiple bands of the unscaled single color version to generate a noise reduced version of the unscaled single color version;
generating the unscaled single color high frequency component by band splitting the noise reduced version of the unscaled single color version; and
merging the unscaled single color high frequency component and the processed version of the first downscaled version to generate a processed version of the received image having multiple color components.

16. The method of claim 13, further comprising:
generating, by a circuit, the downscaled images by recursively downscaling images starting with the first downscaled version; and
feeding at least one of the downscaled images back to the circuit for further recursive downscaling by the circuit.

17. The method of claim 13, further comprising:
filtering a first of the downscaled images using a first kernel to generate a first filtered downscaled image;
decimating the first filtered downscaled image along a first dimension to generate a first decimated downscaled image;
filtering the first decimated downscaled image using a second kernel to generate a second filtered downscaled image; and
decimating the second filtered downscaled image along a second dimension to generate a second of the downscaled images.

18. The method of claim 13, further comprising:
performing noise reduction on multiple bands of the first downscaled version to generate a noise reduced version of the first downscaled version; and
band-splitting the noise reduced version of the first downscaled version to generate a high frequency component of the noise reduced version of the first downscaled version.

19. The method of claim 13, further comprising:
performing noise reduction on multiple bands of each of the downscaled images to generate a noise reduced version of each of the downscaled images;
generating a downscaled high frequency component for each of the downscaled images using the noise reduced version of each of the downscaled images;
merging the downscaled high frequency component and a processed version of a corresponding downscaled low frequency component for a corresponding one of the downscaled images to generate another downscaled low frequency component for another one of the downscaled images, the other downscaled low frequency component further used for merging with a corresponding downscaled high frequency component;
performing local tone mapping operation on the other downscaled low frequency component to generate a processed version of the other downscaled low frequency component; and
performing local photometric contrast enhancement of a single color component of the processed version of the other downscaled low frequency component to generate the processed version of the first downscaled version.

20. A system, comprising:
an image sensor configured to obtain an image;
an image signal processor coupled to the image sensor, the image signal processor configured to perform raw processing of the image to obtain a raw processed version of the image, the image signal processor including:
first stage processing circuitry configured to:
generate an unscaled single color version of the raw processed version by extracting a single color component from the raw processed version, and
generate an unscaled single color high frequency component by band splitting the unscaled single color version;
a scaler circuit configured to generate a first downscaled version of the image having a first pixel resolution lower than a pixel resolution of the image; and
second stage processing circuitry configured to:
generate multiple downscaled images from the first downscaled version, and
generate a processed version of the first downscaled version using the first downscaled version and the downscaled images, the processed version of the first downscaled version merged with the unscaled single color high frequency component.

* * * * *

UNITED STATES PATENT AND TRADEMARK OFFICE
CERTIFICATE OF CORRECTION

PATENT NO.        : 11,010,870 B2
APPLICATION NO.   : 16/848287
DATED             : May 18, 2021
INVENTOR(S)       : Maxim Smirnov It is certified that error appears in the above-identified patent and that said Letters Patent is hereby corrected as shown below:

In the Claims

Column 17, Claim 4, Lines 55-56: Written as "unsealed single color version to generate a noise reduced version of the unsealed single color version;" should be written as "unscaled single color version to generate a noise reduced version of the unscaled single color version;"

Column 17, Claim 4, Lines 59-60: Written as "the unsealed single color high frequency component by band splitting the noise reduced version of the unsealed" should be written as "the unscaled single color high frequency component by band splitting the noise reduced version of the unscaled"

Column 17, Claim 5, Line 63: Written as "a post processor circuit configured to merge the unsealed" should be written as "a post processor circuit configured to merge the unscaled"

Signed and Sealed this
First Day of March, 2022

Drew Hirshfeld
*Performing the Functions and Duties of the
Under Secretary of Commerce for Intellectual Property and
Director of the United States Patent and Trademark Office*